United States Patent [19]

Fischer et al.

[11] Patent Number: 5,777,036

[45] Date of Patent: Jul. 7, 1998

[54] PARTICULATE GRAFT COPOLYMERS AND THERMOPLASTIC MOLDING MATERIALS CONTAINING THEM AND HAVING IMPROVED COLORABILITY

[75] Inventors: Wolfgang Fischer, Ludwigshafen; Jürgen Koch, Neuhofen; Graham Edmund McKee, Neustadt, all of Germany

[73] Assignee: BASF Aktiengesellschaft, Ludwigshafen, Germany

[21] Appl. No.: 839,704

[22] Filed: Apr. 15, 1997

Related U.S. Application Data

[63] Continuation of Ser. No. 595,189, Feb. 1, 1996, abandoned.

[51] Int. Cl.$^6$ .................................................. C08L 51/04
[52] U.S. Cl. ........................... 525/285; 525/74; 525/75; 525/85; 525/296; 525/307; 525/309; 525/312
[58] Field of Search ............................. 525/296, 285, 525/312, 309, 307, 85, 74, 75

[56] References Cited

U.S. PATENT DOCUMENTS

| | | | |
|---|---|---|---|
| 4,564,653 | 1/1986 | Kamata et al. | 525/67 |
| 4,634,734 | 1/1987 | Hambrecht et al. | 525/85 |
| 4,902,745 | 2/1990 | Piejko | 525/80 |
| 5,137,979 | 8/1992 | Maeda | 525/309 |
| 5,196,480 | 3/1993 | Seitz et al. | 525/71 |
| 5,206,299 | 4/1993 | Oshima et al. | 525/305 |
| 5,252,666 | 10/1993 | Seitz | 525/80 |
| 5,296,546 | 3/1994 | Kishida | 525/310 |
| 5,342,898 | 8/1994 | Seitz | 525/281 |
| 5,344,877 | 9/1994 | Fischer | 525/83 |
| 5,367,029 | 11/1994 | Fischer | 525/301 |
| 5,373,060 | 12/1994 | Guentherberg | 525/301 |

FOREIGN PATENT DOCUMENTS

| | | |
|---|---|---|
| 003 905 | 9/1979 | European Pat. Off. |
| 132 339 | 1/1985 | European Pat. Off. |
| 390 144 | 10/1990 | European Pat. Off. |
| 392 767 | 10/1990 | European Pat. Off. |
| 534 212 | 3/1993 | European Pat. Off. |
| 535 456 | 4/1993 | European Pat. Off. |
| 545 377 | 6/1993 | European Pat. Off. |

OTHER PUBLICATIONS

Transparente Polymere Mehrphasensysteme, Biangardi et al.—Applied Macromolecular Chemistry, 1990, vol. 193, pp. 221–241.

*Primary Examiner*—Irina S. Zemel
*Attorney, Agent, or Firm*—Keil & Weinkauf

[57] ABSTRACT

Particulate graft copolymers A) are composed of $a_1$) from 5 to 70% by weight, based on A), of a grafting base having a glass transition temperature of less than 10° C. and based on $a_{11}$) from 50 to 99.94% by weight, based on $a_1$), of at least one alkyl acrylate where the alkyl radical is of 1 to 30 carbon atoms, $a_{12}$) from 0 to 49.9% by weight, based on $a_1$), of a further monounsaturated monomer copolymerizable with $b_{11}$) and $a_{13}$) from 0.01 to 5% by weight, based on $a_1$), of polyfunctional crosslinking monomers.

$a_2$) from 20 to 85% by weight, based on A), of a stage polymerized in the presence of component $a_1$) and comprising $a_{21}$) from 95 to 100% by weight, based on $a_2$), of at least one monomer having a refractive index $n_D^{20}$ of more than 1.51 and $a_{22}$) from 0 to 5% by weight, based on $a_2$), of a polyfunctional, crosslinking monomer and $a_3$) from 10 to 50% by weight, based on A), of at least one further stage polymerized in the presence of the product obtained after the preparation of $a_2$) and comprising $a_{31}$) from 50 to 95% by weight, based on $a_3$), of a vinylaromatic monomer and $a_{32}$) from 5 to 50% by weight, based on $a_3$), of polar, copolymerizable comonomers selected from the group consisting of acrylonitrile, methacrylonitrile, esters of (meth)acrylic acid where the alkyl radical is of 1 to 20 carbon atoms, maleic anhydride, (meth) acrylamide and/or vinyl alkyl ethers where the alkyl radical is of 1 to 8 carbon atoms.

4 Claims, No Drawings

1

PARTICULATE GRAFT COPOLYMERS AND THERMOPLASTIC MOLDING MATERIALS CONTAINING THEM AND HAVING IMPROVED COLORABILITY

This application is a continuation of application Ser. No. 08/595,189, filed on Feb. 1, 1996, now abandoned.

The present invention relates to particulate graft copolymers composed of $a_1$) from 5 to 70% by weight, based on A), of a grafting base having a glass transition temperature of less than 10° C. and based on $a_{11}$) from 50 to 99.94% by weight, based on $a_1$), of at least one alkyl acrylate where the alkyl radical is of 1 to 30 carbon atoms, $a_{12}$) from 0 to 49.9% by weight, based on $a_1$), of a further monounsaturated monomer copolymerizable with $b_{11}$) and $a_{13}$) from 0.01 to 5% by weight, based on $a_1$), of polyfunctional crosslinking monomers, $a_2$) from 20 to 85% by weight, based on A), of a stage polymerized in the presence of component $a_1$) and comprising $a_{21}$) from 95 to 100% by weight, based on $a_2$), of at least one monomer having a refractive index $n_D^{20}$ of more than 1.51 and $a_{22}$) from 0 to 5% by weight, based on $a_2$), of a polyfunctional, crosslinking monomer and $a_3$) from 10 to 50% by weight, based on A), of at least one further stage polymerized in the presence of the product obtained after the preparation of $a_2$) and comprising $a_{31}$) from 50 to 95% by weight, based on $a_3$), of a vinylaromatic monomer and $a_{32}$) from 5 to 50% by weight, based on $a_3$), of polar, copolymerizable comonomers selected from the group consisting of acrylonitrile, methacrylonitrile, esters of (meth)acrylic acid where the alkyl radical is of 1 to 20 carbon atoms, maleic anhydride, (meth) acrylamide or vinyl alkyl ethers where the alkyl radical is of 1 to 8 carbon atoms, or mixtures thereof.

In order to obtain an impact-resistant, thermoplastic molding material, graft rubbers are added to polymers which are brittle at room temperature and which form the matrix. The preparation of particulate graft polymers from an elastomeric core, ie. a polymer having a glass transition temperature of less than 0° C., and a graft shell having a glass transition temperature of more than 25° C. (glass transition temperature determined by the DSC method; K. H. Illers, Makromol. Chemie 127 (1969), 1), for example by emulsion polymerization, is known. For this purpose, a grafting base is first prepared by emulsion polymerization of suitable monomers. The monomers which are intended to form the graft shell are then polymerized in the presence of the grafting base. The monomers for the outermost graft shell are as a rule chosen so that they are compatible or partially compatible with the thermoplastic to be modified. The preparation of such impact modifiers has long been known and is described, for example, in EP 132 339. However, these graft rubbers generally lead to a deterioration in the colorability of the thermoplastics. This is all the more true the larger the rubber particles and the larger the difference between the refractive indices of the matrix and of the rubber particles (cf. H. J. Biangardi, Angew. Makrom. Chem. 183 (1990), 221–241). EP 3 905 describes a process for the preparation of coarse emulsion particles by swelling smaller emulsion particles, inter alia with organic solvents or with monomers which are polymerized after stirring has been carried out for a certain time. Since these emulsion particles do not contain a graft shell, they are not very suitable for modifying thermoplastics.

For many applications, it is necessary to color toughened thermoplastic molding materials in order to satisfy the wishes of customers.

It is an object of the present invention to improve the colorability of toughened thermoplastic molding materials and to provide components for the preparation of such molding materials.

We have found that this object is achieved, according to the invention, by the particulate graft copolymers as claimed in claim 1 and by the thermoplastic molding materials as claimed in claim 2.

Preferred embodiments of the invention are described in the sub-claims and in the following description.

The novel graft copolymer contains, as component $a_1$), from 5 to 70, preferably from 10 to 65, in particular from 15 to 60, % by weight, based on A), of a grafting base having a glass transition temperature of less than 10° C., composed of $a_{11}$) from 50 to 99.94, preferably from 55 to 98, in particular from 60 to 95, % by weight, based on $a_1$), of an alkyl acrylate where the alkyl radical is of 1 to 30 carbon atoms, $a_{12}$) from 0 to 49.9, preferably from 2 to 45, in particular from 4 to 40, % by weight, based on $a_1$), of a further monounsaturated monomer copolymerizable with $a_{11}$) and $a_{13}$) from 0.01 to 5, preferably from 0.05 to 4, in particular from 0.1 to 4, % by weight, based on $a_1$), of a polyfunctional, crosslinking monomer.

Preferred monomers $a_{11}$) are alkyl acrylates where the alkyl radical is of 2 to 30 carbon atoms, in particular ethyl acrylate, tert-butyl acrylate, isobutyl acrylate, n-butyl acrylate and 2-ethylhexyl acrylate, among which the two last-mentioned are particularly preferred.

Examples of preferred monomers $a_{12}$) are isoprene, butadiene, styrene, acrylonitrile, methacrylonitrile and/or vinyl alkyl ethers where the alkyl radical is of 1 to 8 carbon atoms (eg. vinyl methyl ether, vinyl propyl ether or vinyl ethyl ether) or mixtures thereof.

Examples of crosslinking polyfunctional monomers $a_{13}$) are divinylbenzene, diallyl maleate, diallyl fumarate, diallyl phthalate and dihydrodicyclopentadienyl acrylate (DCPA, as described in DE-A 12 60 135), the last-mentioned compound being preferred.

Further examples are triallyl cyanurate and triallyl isocyanurate.

By using the comonomers $a_{12}$) and $a_{13}$), it is possible to control the property profile of the polymers $a_1$), for example with regard to the degree of crosslinking, which may be desirable in some cases.

Processes for the preparation of polymers $a_1$) are known to a person skilled in the art and are described in the literature, for example in German Patent 1,260,135. Corresponding products are also commercially available.

Preparation by emulsion polymerization has proven particularly advantageous in some cases.

The exact polymerization conditions, in particular the type, metering and amount of emulsifier, are preferably chosen so that the latex of the acrylate, which is at least partially crosslinked, has an average particle size (weight average $d_{50}$) of from about 50 to 700 nm, in particular from 100 to 600 nm.

Stage $a_2$) of the novel graft copolymers is prepared by polymerization of the corresponding monomers $a_{21}$) and, if required, $a_{22}$) in the presence of stage $a_1$).

Suitable monomers $a_{21}$) are in principle all polymerizable monomers having a refractive index $n_D^{20}$ of more than 1.51. Vinylaromatic monomers, for example styrene or substituted styrenes of the formula I shown further below, are preferred, particularly preferably styrene, α-methylstyrene, p-methylstyrene or tert-butylstyrene.

In the preparation of stage $a_2$), it has proven advantageous if the monomers $a_{21}$) and, if required, $a_{22}$), with or without a free radical initiator, are added slowly and the resulting mixture is thoroughly mixed over a certain period before the polymerization itself is initiated by increasing the temperature.

A third stage $a_3$) is grafted onto the grafting base $a_1$) and $a_2$), said stage $a_3$) being obtained by copolymerization of $a_{31}$) from 50 to 95, preferably from 60 to 90, in particular from 65 to 80, % by weight of a vinylaromatic monomer, preferably styrene or substituted styrenes of the general formula I

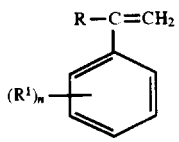

where R is alkyl of 1 to 8 carbon atoms, hydrogen or halogen, $R^1$ is alkyl of 1 to 8 carbon atoms or halogen and n is 0, 1, 2 or 3, and $a_{32}$) from 5 to 50, preferably from 10 to 40, in particular from 20 to 35, % by weight of polar copolymerizable monomers acrylonitrile, methacrylonitrile, esters of (meth)acrylic acid where the alkyl radical is of 1 to 20 carbon atoms, maleic anhydride, (meth)acrylamide, vinyl alkyl ethers where the alkyl radical is of 1 to 8 carbon atoms or phenylmaleimide or mixtures thereof.

The graft shell $a_3$) can be prepared in one or more, for example two or three, process steps, and the overall composition remains unaffected by this.

The graft shell is preferably prepared in emulsion, as described, for example, in German Patent 1,260,135 and German Laid-Open Applications DOS 3,227,555, DOS 3,149,357, DOS 3,149,358 and DOS 3,414,118.

Depending on the conditions chosen, a certain proportion of free copolymers of styrene and acrylonitrile is formed in the graft copolymerization.

The novel graft copolymer generally has an average particle size of, preferably, from 50 to 1000 nm, in particular from 100 to 700 nm ($d_{50}$ weight average). The conditions during the preparation of the elastomer $b_1$) and during the grafting are therefore preferably chosen so that particle sizes in this range result. The relevant measures are known and are described, for example, in German Patent 1,260,135, German Laid-Open Application DOS 2,826,925 and J. Appl. Polym. Sci. 9 (1965), 2929–2938. The particle size of the latex of the elastomer can be increased, for example, by means of agglomeration.

In some cases, mixtures of a plurality of acrylate polymers which have different particle sizes have also proven useful. Corresponding products are described in German Laid-Open Application DOS 2,826,925 and U.S. Pat. No. 5,196,480, which are referred to here for further details.

Accordingly, preferably used mixtures of acrylate polymers are those in which a first polymer has a particle size $d_{50}$ of from 50 to 150 nm and a second polymer has a particle size of from 200 to 700 nm, as described in the abovementioned U.S. Pat. No. 5,196,480.

A further embodiment of the invention relates to thermoplastic molding materials which, in addition to the novel graft copolymer (A), contain a further thermoplastic polymer B having a glass transition temperature of more than 20° C. The ratio A:B is in general from 5:95 to 95:5, preferably from 10:90 to 90:10, in particular from 80:20 to 20:80.

Preferred polymers B are polymers based on methyl methacrylate, in particular polymethyl methacrylate and copolymers of from 50 to 95, preferably from 55 to 90, and in particular from 60 to 85, % by weight of vinylaromatic monomers and from 5 to 50, preferably from 10 to 45, particularly preferably from 15 to 40, % by weight of polar copolymerizable monomers selected from the group consisting of acrylonitrile, methacrylonitrile, esters of (meth)acrylic acid where the alkyl radical is of 1 to 4 carbon atoms, maleic anhydride, (meth)acrylamide, vinyl alkyl ethers where the alkyl radical is of 1 to 8 carbon atoms or phenylmaleimide or mixtures thereof.

Styrene and substituted styrenes of the general formula I

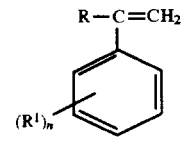

where R is alkyl of 1 to 8 carbon atoms, hydrogen or halogen, $R^1$ is alkyl of 1 to 8 carbon atoms or halogen and n is 0, 1, 2 or 3, have proven useful as vinylaromatic monomers.

Processes for the preparation of polymers B are known to a person skilled in the art; corresponding products are commercially available.

The novel molding materials may contain, as component C), from 0 to 50, preferably from 5 to 45, in particular from 10 to 40, % by weight of fibrous or particulate fillers or mixtures thereof.

Examples of fillers are carbon fibers or glass fibers in the form of woven glass fabrics, glass mats or glass rovings, glass beads and wollastonite, particularly preferably glass fibers.

When glass fibers are used, they may be provided with a size and an adhesion promoter in order to improve the compatibility with the blend components. In general, the carbon fibers and glass fibers used have a diameter of from 6 to 20 μm.

The glass fibers can be incorporated both in the form of short glass fibers and in the form of rovings. The average length of the glass fibers is from 0.05 to 0.5 mm, preferably from 0.08 to 0.45 mm (in the injection molded part).

Suitable particulate fillers are amorphous silica, asbestos, magnesium carbonate (chalk), powdered quartz, mica, talc, feldspar and in particular calcium silicates, such as wollastonite and kaolin (preferably calcined kaolin).

Preferred combinations of fillers are, for example, 20% by weight of glass fibers with 15% by weight of wollastonite and 15% by weight of glass fibers with 15% by weight of wollastonite.

The novel thermoplastic molding materials may contain as component D, up to 30, preferably from 0.5 to 10, % by weight of conventional additives and processing assistants.

Conventional additives are, for example, stabilizers and antioxidants, heat stabilizers and UV stabilizers, lubricants and mold release agents, colorants, such as dyes and pigments, pulverulent fillers and reinforcing agents, and plasticizers. Such additives are used in the usual effective amounts.

The stabilizers can be added to the materials at any stage of the preparation of the thermoplastic materials. The sta bilizers are preferably added at an early stage in order to prevent decomposition from beginning before the material can be protected.

The antioxidants and heat stabilizers which can be added to the thermoplastic materials according to the invention include those which are generally added to polymers, such as sterically hindered phenols, hydroquinones, various substituted members of this group and combinations thereof, in concentrations of up to 1% by weight, based on the weight of the mixture.

Furthermore, stabilizers which are generally added to polymers may be used in amounts of up to 2.0% by weight, based on the mixture.

Examples of stabilizers are various substituted resorcinols, salicylates, benzotriazoles, benzophenones, HALS stabilizers and the like, as commercially obtainable under the tradenames Topanol®, Irganox® and Tinuvin®.

Suitable lubricants and mold release agents, which are added to the thermoplastic material, for example, in amounts of up to 7% by weight, are stearic acids, stearyl alcohol, stearates and stearamides.

Further possible additives are silicone oils, preferably in amounts of from 0.05 to 1% by weight.

Organic dyes, such as nigrosine, and pigments, eg. titanium dioxide, cadmium sulfide, cadmium sulfide selenide, phthalocyanines, ultramarine blue or carbon black, may also be added.

Mixing of the components A), B) and, if required, C) and/or D) is carried out as a rule by methods known per se and described in the literature, in the melt, preferably in an extruder.

The novel molding materials have good toughness in combination with good colorability. Coloring or pigmentation may be effected by methods known per se.

Owing to their property spectrum, the novel thermoplastic molding materials are particularly suitable for the production of colored shaped articles of all kinds, such as fibers, films and moldings.

EXAMPLES 1 to 3 (Preparation of Rubber Components)

Example 1

Preparation of Graft Copolymer A1

1. Preparation of Rubber 1
1.1 Preparation of the Grafting Base $a_1$)

A monomer mixture comprising 3.2 g of the acrylate of tricyclodecenyl alcohol and 156.8 g of butyl acrylate in 1500 g of water was heated to 65° C. while stirring, with the addition of 5 g of the potassium salt of a $C_{12}$–$C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of the acrylate of tricyclodecenyl alcohol and 823.2 g of butyl acrylate was metered in over 3 hours. After the end of the monomer addition, the emulsion was kept at 65° C. for a further hour.

1.2 Preparation of the Intermediate $a_2$)

A mixture of 1764 g of styrene, 36 g of the acrylate of tricyclodecenyl alcohol and 3.6 g of benzoyl peroxide was added to a mixture of 450 g of the grafting base 1.1, 2600 g of water and 3.6 g of the potassium salt of a $C_{12}$–$C_{18}$-paraffinsulfonic acid at 30° C. in the course of 4 hours. stirring was carried out for 3 hours at 30° C. and the temperature was then increased to 65° C. until complete conversion occurred.

1.3 Preparation of Stage $a_3$)

2100 g of the emulsion prepared by the above method (1.2) were mixed with 1150 g of water and 2.7 g of potassium peroxodisulfate and heated to 65° C. while stirring. After the reaction temperature had been reached, a monomer mixture comprising 495 g of styrene and 165 g of acrylonitrile was metered in over 3 hours. After the end of the addition, the emulsion was kept at 65° C. for a further 2 hours. The graft copolymer had an average particle size of 210 nm. The graft polymer was precipitated from the emulsion by means of calcium chloride solution at 95° C., washed with water and dried in a warm air stream.

Example 2

Preparation of Graft Copolymer A2
2. Preparation of Rubber 2
2.1 Preparation of the Grafting Base $a_1$)

12.5 g of the emulsion prepared by method 1.1 were heated with 1500 g of water to 65° C. while stirring and with the addition of 3 g of potassium peroxodisulfate, 3 g of sodium bicarbonate and 1.5 g of sodium pyrophosphate. A mixture of 20 g of the acrylate of tricyclodecenyl alcohol and 980 g of butyl acrylate and 3 g of the potassium salt of a $C_{12}$–$C_{18}$-paraffinsulfonic acid was metered in over 3 hours. After the end of the monomer addition, the emulsion was kept at 65° C. for a further hour.

2.2 Preparation of the Intermediate $a_2$)

The intermediate was prepared as described under 1.2, the emulsion prepared by method 2.1 being used instead of emulsion 1.1.

2.3 Preparation of Stage $a_3$)

2100 g of the emulsion prepared by the above method (2.2) were mixed with 1150 g of water and 2.7 g of potassium peroxodisulfate and heated to 65° C. while stirring. After the reaction temperature had been reached, a monomer mixture comprising 165 g of styrene and 0.1 g of the potassium salt of a $C_{12}$–$C_{18}$-paraffinsulfonic acid was metered in over 1 hour. After the end of the addition, a mixture of 372 g of styrene and 124 g of acrylonitrile was metered in and the emulsion was then kept at 65° C. for a further 2 hours. The average particle size of the graft polymers was 610 nm. The graft polymer was precipitated from the emulsion by means of calcium chloride solution at 95° C., washed with water and dried in a warm air stream.

Example 3

Preparation of Graft Copolymer A3

Rubber 3 was prepared as described under 1., but only 850 g of styrene were used in the preparation of the intermediate. The graft copolymer had an average particle size of 180 nm.

Comparative Experiments

No intermediate was prepared in the comparative experiments, ie. the grafting bases 1.1 and 2.1 were grafted directly with styrene and acrylonitrile, as described under 1.3, 2.3 or 3. The average particle sizes of the corresponding graft rubber were:

Comparative graft rubber 1.: 105 nm

Comparative graft rubber 2.: 480 nm.

Examples 4 to 7

Preparation of Molding Materials

For the preparation of the novel molding materials, a styrene/acrylonitrile copolymer having an acrylonitrile content of 35% and a viscosity number of 80 ml/g (the viscosity numbers were determined in a 0.5% strength solution in DMF at 23° C.) was used as component B. The precipitated and dried graft copolymers were mixed with component B in an extruder at 260° C. so that the content of component A was 50% by weight. Shaped articles were produced from this mixture, and the dE values of said shaped articles were determined.

The dE values were calculated according to DIN 6174 from an improvement in the color difference of the test specimens against white and black backgrounds.

dE values of the mixtures with the rubbers 1 to 3 and the comparative experiments:

|  | dE |
| --- | --- |
| Mixture with graft polymer A1 | 21 |
| Mixture with graft polymer A2 | 12 |
| Mixture with graft polymer A3 | 17 |
| Mixture with comparative graft rubber 1 | 7 |
| Mixture with comparative graft rubber 2 | 2 |

We claim:

1. A particulate graft copolymer A) composed of $a_1$) from 50 to 70% by weight, based on A), of a grafting base having a glass transition temperature of less than 10° C. and based on $a_{11}$) from 50 to 99.94% by weight, based on $a_1$), of at least one alkyl acrylate where the alkyl radical is of 1 to 30 carbon atoms, $a_{12}$) from 0 to 49.9% by weight, based on $a_1$), of a further monounsaturated monomer copolymerizable with $a_{11}$) and $a_{13}$) from 0.01 to 5% by weight, based on $a_1$), of a polyfunctional crosslinking monomer, $a_2$) from 20 to 85% by weight, based on A), of a highly refractive stage polymerized in the presence of component $a_1$), and consisting of $a_{21}$) from 95 to 100% by weight, based on $a_2$), of at least one unsaturated monomer each of which having a refractive index $n_D^{20}$ of more than 1.51 and $a_{22}$) from 0 to 5% by weight, based on $a_2$), of a polyfunctional, crosslinking monomer, the highly refractive stage being prepared by: (1) adding gradually and slowly monomers $a_{21}$) and $a_{22}$), and optionally a free radical initiator, to a mixture containing grafting base $a_1$) to prepare an admixture; (2) thoroughly mixing the admixture prepared in step (1) over a period of time to prepare a thoroughly mixed admixture, wherein the steps (1) of adding the monomers and (2) of mixing the admixture are conducted at the temperature below the temperature of polymerization initiation of monomers $a_{21}$) and $a_{22}$); and (3) increasing the temperature of the thoroughly mixed admixture of step (2) to initiate polymerization; and $a_3$) from 10 to 50% by weight, based on A), of at least one further stage polymerized in the presence of the product obtained after the preparation of $a_2$) and consisting essentially of $a_{31}$) from 50 to 95% by weight, based on $a_3$), of a vinylaromatic monomer and $a_{32}$) from 5 to 50% by weight, based on a3), of polar, copolymerizable comonomers selected from the group consisting of acrylonitrile, methacrylonitrile, esters of (meth)acrylic acid where the alkyl radical is of 1 to 20 carbon atoms, maleic anhydride, (meth) acrylamide or vinyl alkyl ethers where the alkyl radical is of 1 to 8 carbon atoms, or mixtures thereof.

2. A thermoplastic molding material containing

A) a particulate graft copolymer as claimed in claim 1 and

B) a thermoplastic polymer which differs from A and has a glass transition temperature of more than 20° C.

3. A thermoplastic molding material as claimed in claim 2, containing, as component B), a copolymer of $b_1$) from 50 to 90% by weight of styrene or α-methylstyrene, or mixtures thereof, and $b_{21}$) from 10 to 50% by weight of (meth)acrylonitrile or methyl (meth)acrylate, or mixtures thereof, and $b_{22}$) from 0 to 40% by weight of other unsaturated monomers $b_2$).

4. A process for producing thermoplastic molding materials having improved colorability, which process comprises mixing a particulate graft copolymer A) as claimed in claim 1 in the melt with a thermoplastic polymer which differs from A) and has a glass transition temperature of more than 20° C.

* * * * *